(12) United States Patent
Rajyaguru et al.

(10) Patent No.: US 11,675,751 B2
(45) Date of Patent: Jun. 13, 2023

(54) SYSTEMS AND METHODS FOR CAPTURING DATA SCHEMA FOR DATABASES DURING DATA INSERTION

(71) Applicant: International Business Machines Corporation, Armonk, NY (US)

(72) Inventors: Chintan Rajyaguru, Cary, NC (US); David Leo Rocker, Rougemont, NC (US); Jacob McPherson, Franklinton, NC (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 17/108,374

(22) Filed: Dec. 1, 2020

(65) Prior Publication Data

US 2022/0171747 A1 Jun. 2, 2022

(51) Int. Cl.
*G06F 16/25* (2019.01)
*G06F 16/21* (2019.01)
*G06F 16/84* (2019.01)
*G06F 16/908* (2019.01)
*G06F 16/835* (2019.01)
*G06Q 40/02* (2023.01)
*G06Q 50/26* (2012.01)

(52) U.S. Cl.
CPC .......... *G06F 16/212* (2019.01); *G06F 16/25* (2019.01); *G06F 16/835* (2019.01); *G06F 16/86* (2019.01); *G06F 16/908* (2019.01); *G06Q 40/02* (2013.01); *G06Q 50/26* (2013.01)

(58) Field of Classification Search
CPC ........ G06F 16/212; G06F 16/86; G06F 16/25; G06F 16/908; G06F 16/835

USPC .......................................................... 707/803
See application file for complete search history.

(56) References Cited

U.S. PATENT DOCUMENTS

| | | | |
|---|---|---|---|
| 9,773,029 B2 | 9/2017 | Kulkarni | |
| 10,366,059 B2 | 7/2019 | Shi et al. | |
| 10,489,355 B1* | 11/2019 | Messmer | G06F 16/211 |
| 2012/0005175 A1 | 1/2012 | Vora | |
| 2016/0085778 A1* | 3/2016 | Shi | G06F 16/211 |
| | | | 707/803 |
| 2016/0224594 A1 | 8/2016 | Chow et al. | |
| 2016/0335361 A1 | 11/2016 | Teodorescu et al. | |
| 2017/0161341 A1* | 6/2017 | Hrabovsky | G06T 11/206 |
| 2019/0073388 A1* | 3/2019 | Desmarets | G06F 16/213 |

FOREIGN PATENT DOCUMENTS

CN 106326381 A 6/2019

* cited by examiner

*Primary Examiner* — Hosain T Alam
*Assistant Examiner* — Tracy M McGhee
(74) *Attorney, Agent, or Firm* — Scully, Scott, Murphy & Presser, P.C.

(57) ABSTRACT

A method and/or system includes: adding a new source of data to be stored in the data storage system; obtaining the schema for the new source of data to be stored in the data storage system; storing the data to be stored in the data storage system in a Not Only Structured Query Language (NOSQL) database in the data storage system; and storing schema for the data to be stored in the data storage system in a metadata store in the electronic data storage system wherein the metadata store is separate from the NOSQL database.

20 Claims, 7 Drawing Sheets

SYSTEMS AND METHODS FOR CAPTURING DATA SCHEMA FOR DATABASES DURING DATA INSERTION

BACKGROUND

This disclosure relates generally to improved data management and processing for databases, including ingesting and/or capturing data and metadata from one or more data sources in an information handling system. More specifically, the present disclosure relates to a system, application, platform, and/or method for capturing data and metadata in computerized environments in a manner that typically facilitates running both applications and analytical processing.

There is a regulatory need for monitoring financial transactions and activity of account holders at financial and insurance institutions to detect any fraudulent or criminal activity such as, for example, money laundering. Governmental anti-money laundering (AML) and other regulations may require a financial institution to monitor for activities and behavior indicative of criminal or fraudulent activity. Detecting financial activity indicative of fraudulent or criminal activity often requires data analysis of numerous complex transactions involving numerous parties and is increasingly difficult due to the involvement of a large amount of information and data that exists and is stored in many different electronic formats using different schema.

The use of electronic data storage is widespread. The relatively rapid increase in the amount of electronic data being created requires the storage and management of a large volume of electronic data. Large computer systems and network storage allow users to store and process large collections of data. Users and organizations that deal with significant quantities of digital information often have difficulty managing, searching, processing, and analyzing data in an efficient and intuitive manner. For some organizations and enterprises, for example, financial institutions, the inability to easily store, organize, search, locate, mange, process, and analyze data to run their operations and to comply with regulations, for example to detect criminal and/or suspicious activity or behavior, can translate into significant inefficiencies.

SUMMARY

The summary of the disclosure is given to aid understanding of data storage or information handling systems, their architectural structures, and their methods of storing, organizing, managing, searching, processing, capturing, ingesting, and/or extracting data and metadata residing on data storage systems, and not with an intent to limit the disclosure of the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the data storage or information handling systems, their architectural structures, and their methods of operation to achieve different effects.

Methods, techniques, processes, systems, applications, platforms, programming instructions, and/or media containing program instructions are disclosed for storing, managing, and processing electronic data, and in an embodiment ingesting or capturing data from one or more data sources to a data store and a metadata store. In one or more embodiments, methods, processes, techniques, systems, applications, platforms, computer program products, and/or media containing programming instructions for ingesting and/or capturing data and metadata into a database, preferably a Not Only Structured Query Language (NOSQL) database are disclosed, preferably where the database or data store can run both applications of the organization and analytical processing even in big data environments.

A method and/or system of capturing data in an electronic data storage system is disclosed according to one or more embodiments. The method and/or system includes: adding a new source of data to be stored in the data storage system; obtaining the schema for the new source of data to be stored in the data storage system; storing the data to be stored in the data storage system in a Not Only Structured Query Language (NOSQL) database in the electronic data storage system; and storing schema for the data to be stored in the data storage system in a metadata store in the electronic data storage system wherein the metadata store is separate from the NOSQL database. The method and/or system also in an embodiment includes providing the schema for the new source of data to be added to the data storage system. In an aspect, obtaining the schema for the new source of data from at least one of the group consisting of a configuration file, a properties file, and combinations thereof, and in a further aspect, obtaining the schema for the new data source of data comprises deriving the schema for the new source of data from a library. The method and/or system in an embodiment includes storing the data in the NOSQL database in the electronic data storage system on a record by record basis, preferably by record ID. In a further aspect, storing the metadata in the data store on a record by record basis, preferably by record ID. The method and/or system further includes in one or more embodiments obtaining data from the electronic data storage system by looking up the schema by record ID from the metadata store, and in a further aspect includes looking up the records from the NOSQL database using the schema obtained from the metadata store.

In one or more embodiments a computer program product is disclosed that includes a machine readable medium, preferably non-transitory machine readable medium, storing instructions that, when executed by at least one programmable processor, cause the at least one programmable processor to perform operations that include adding a new source of data to be stored in the data storage system; obtaining the schema for the new source of data to be stored in the data storage system; on a record by record basis, storing the data to be stored in the data storage system by record ID in a Not Only Structured Query Language (NOSQL) database in the electronic data storage system; and on a record by record basis, storing schema for the data to be stored in the data storage system by record ID in a metadata store in the electronic data storage system wherein the metadata store is separate from the NOSQL database. In an aspect, the computer program product further includes instructions that, when executed by the at least one programmable processor, cause the at least one programmable processor to perform operations that: provide the schema for the new source of data to be added to the data storage system; and in a further aspect obtain the schema for the new data source of data from at least one of the group consisting of a configuration file, a properties file, and combinations thereof; and/or by deriving the schema for the new source of data from a library. The computer program product further includes in an embodiment instructions that, when executed by the at least one programmable processor, cause the at least one programmable processor to obtain data from the electronic data storage system by looking up the schema by record ID from the metadata store, and in a further aspect look up the records from the NOSQL database using the schema obtained from the metadata store.

A system is disclosed that includes in an aspect at least one programmable processor; a data storage system comprising a Not Only Structured Query Language (NoSQL) database for storing data and a separate metadata store for storing the schema corresponding to the data stored in the NOSQL database; and a machine-readable medium, preferably a non-transitory machine-readable medium, for storing instructions that, when executed by the at least one programmable processor, cause the at least one programmable processor to: add a new source of data to be stored in the data storage system; obtain the schema for the new source of data to be stored in the data storage system; on a record by record basis, store the data to be stored in the data storage system by record ID in a Not Only Structured Query Language (NOSQL) database in the electronic data storage system; and on a record by record basis, store the schema for the data to be stored in the data storage system by record ID in a metadata store in the electronic data storage system wherein the metadata store is separate from the NOSQL database. In an aspect the system further includes instructions that, when executed by the at least one programmable processor, cause the at least one programmable processor to perform at least one of the group consisting of (i) providing the schema for the for the new data source to be added to the data storage system; (ii) obtaining the schema from at least one of the group consisting of a configuration file, a properties file, and combinations thereof; and (iii) deriving the schema for the new source of data from a library. The system in an embodiment further includes instructions that, when executed by the at least one programmable processor, cause the at least one programmable processor to obtain data from the electronic data storage system by at least in part looking up the schema by record ID from the metadata store, and in a further aspect look up the records from the NOSQL database using the schema obtained from the metadata store.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of data storage or information handling systems, their architectures, and/or the processing, storing, organizing, managing, searching, ingesting, loading, and/or capturing electronic data in data storage or information handling systems, will be better understood when read in conjunction with the figures provided. Embodiments are provided in the figures for the purpose of illustrating aspects, features, and/or various embodiments of the data storage or information handling systems, their architectural structures, and/or the processing, storing, organizing, managing, searching, ingesting, and/or capturing data (and metadata) in data storage systems or databases, but the claims should not be limited to the precise arrangement, structures, features, aspects, assemblies, subassemblies, systems, circuitry, functional units, modules, embodiments, or devices shown, and the arrangements, structures, assemblies, subassemblies, systems, features, aspects, circuitry, functional units, modules, embodiments, devices, methods, and/or processes, shown may be used singularly or in combination with other arrangements, structures, assemblies, subassemblies, systems, features, aspects, circuitry, functional units, modules, embodiments, devices, methods and/or processes.

DETAILED DESCRIPTION

The following description is made for illustrating the general principles of the invention and is not meant to limit the inventive concepts claimed herein. In the following detailed description, numerous details are set forth in order to provide an understanding of data storage and information handling systems, their architectural structures, and/or methods of operation, including the processing, storing, organizing, managing, searching, ingesting, capturing, and/or loading of data (and metadata) in data storage, including in a database or data store, however, it will be understood by those skilled in the art that different and numerous embodiments of the data storage or information handling system, its architectural structure, and/or methods of operations, including the processing, storing, organizing, managing, searching, ingesting, and/or capturing of data (and metadata) may be practiced without those specific details, and the claims and disclosure should not be limited to the embodiments, structures, mechanisms, functional units, modules, circuitry, assemblies, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "content" or "data" means any computer-readable data including, but not limited to, digital photographs, digitized analog photos, music files, video clips, text documents, interactive programs, web pages, word processing documents, computer assisted design files, blueprints, flowcharts, invoices, database reports, database records, spread sheets, charts, tables, graphs, video game assets, sound samples, transaction log files, tables, electronic documents, files which simply name other objects, and the like. Data may include structured data (e.g., database files and objects), unstructured data (e.g., documents), and/or semi-structured data.

As used herein, the term "metadata" refers to any descriptive or identifying information in computer-processable form that is associated with particular content, data, or a data set. Generally speaking, content will have metadata that is relevant to a number of characteristics of the content and/or the overall content collection, including, but not limited to, the content's technical aspects (format, bytes used, date of creation), the workflow in which the content participates (creator, owner, publisher, date of publication, copyright information, etc) and the subject matter of the content (the nature of the sound of an audio file, be it music or a sound-effect, the subject of a photograph or video clip, the abstract of a lengthy text document, excerpted particulars of invoices or other data-interchange format files). For example, metadata items may include but are not limited to one or more of the following: the content owner (e.g., the client or user that generates the content), the creation time (e.g., creation time stamp), the last modified time (e.g., timestamp of the most recent modification of data), a data set name (e.g., a file name), a data set size (e.g., number of bytes of data set), information about the content (e.g., an indication as to the existence of a particular search term), table names, column headers including column family and column name, names, user-supplied or custom metadata tags, to/from information for email (e.g., an email sender, recipient, etc.), creation date, file type (e.g., format or application type), last accessed time, application type (e.g., type of application that generated the data block), location/network (e.g., a current, past or future location of the data set and network pathways to/from the data block), geographic location (e.g., GPS coordinates), frequency of change (e.g., a period in which the data set is modified), business unit (e.g., a group or department that generates, manages or is otherwise associated with the set), aging information (e.g., a schedule, such as a time period, in which the data set is migrated to secondary or long term storage), boot sectors, partition layouts, file location within a file folder directory structure, user permissions, owners, groups, access control lists (ACLS), system metadata (e.g., registry information), combinations of the same or the other similar information related to the data set. The term "metadata tag", or "metadata attributes" (also referred to as custom metadata tags or attributes) refers to any descriptive or identifying information in computer-processable form that is associated with particular metadata, and that is indicative of the actual information or the content included in various data storage systems and with which the metadata is associated. A metadata tag is also referred to as metadata attributes.

The following discussion omits or only briefly describes conventional features of data storage systems and information processing systems, data storage and management systems, their architectural structures, and/or methods of operation, including the processing, storing, organizing, managing, ingesting, capturing, loading, and/or searching for data and metadata, which are apparent to those skilled in the art. It is assumed that those skilled in the art are familiar with the general architecture of data processing and information handling systems, data storage systems, their architectural structures, and/or their methods of operations, including the processing, storing, organizing, managing, ingesting, capturing, loading, and/or searching for data. It may be noted that a numbered element is numbered according to the figure in which the element is introduced, and is typically referred to by that number throughout succeeding figures.

In one or more embodiments, applications, systems and/or methods for processing, ingesting, capturing and/or loading of data (and metadata) are disclosed. In one or more embodiments, systems, applications, methods, and techniques are disclosed for ingesting or capturing data from one or more data sources (e.g., from different applications) to a database or data store for use by both the applications of the organization and analytic processing by the organization. In one or more embodiments, systems, applications, platforms, methods, and/or techniques are disclosed to ingest or capture data from one or more data sources, for example a client application, to a data store, preferably a NOSQL data store or database, for storing and maintaining data, and in addition ingest and capture the schema of the data from the one or more data sources into a separate metadata store. The data in the data store and the metadata in the separate metadata store are used in one or more embodiments for analytical processing, and in an aspect allows analytical processes to run directly against a NOSQL database. In one or more aspects, a system, platform, application and/or technique is disclosed that builds the list of columns and data schema during insertion in the NOSQL database. Associating the schema of the data in a metadata store during data ingestion with the data which is stored in a separate data store (separate from the metadata/schema) permits quicker data analysis. In one or more embodiments, the system, platform, application and/or technique offers a smaller storage footprint because the need to maintain copies of data in flat files for analytical processing is eliminated. The system, platform, application and/or technique in one or more aspects preferably provides one data store for both applications and analytical processing even in big data environments.

Figure 1:
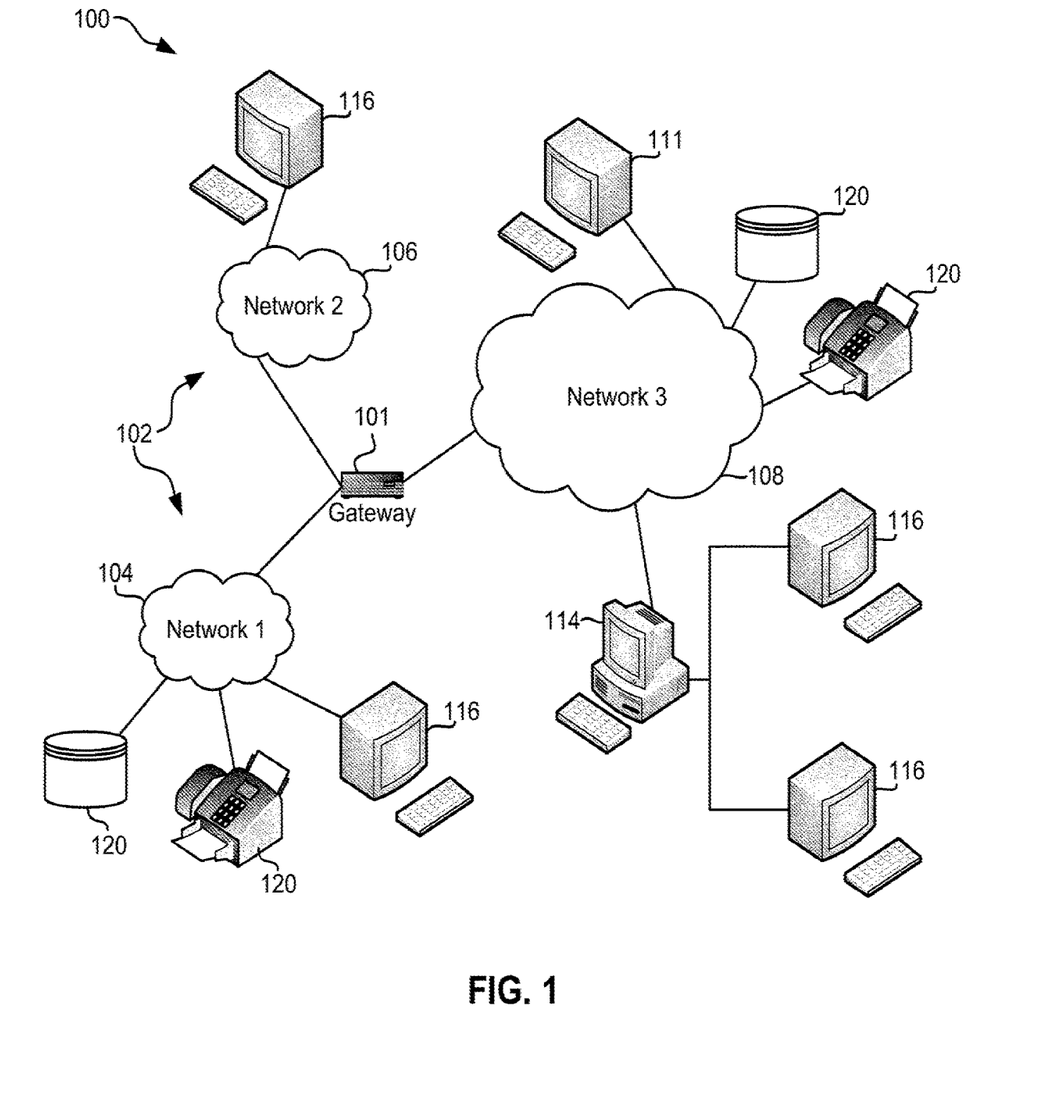
FIG. 1 depicts one example of a data processing or information handling system, also considered a computing environment, according to an embodiment of the present disclosure.

Turning to the environments in which the system, methods, and techniques have potential application, FIG. 1 illustrates architecture 100 of a data processing or information handling system, also referred to as a computer network system, in accordance with an embodiment. The information handling/data processing system 100 can be an example platform on which an organization or enterprise can run its business and operations. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, smartphone, or any other type of logic device. It should be noted that in an embodiment a user device 111 may also be directly coupled to any of the networks.

A peripheral 120 or series of peripherals 120, e.g., facsimile machines, printers, networked and/or local storage units or systems, etc., may be coupled to one or more of the networks 104, 106, 108. It should be noted that data storage, memory, and/or additional components may be utilized with, or integrated into, any type of network element coupled to networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In one or more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
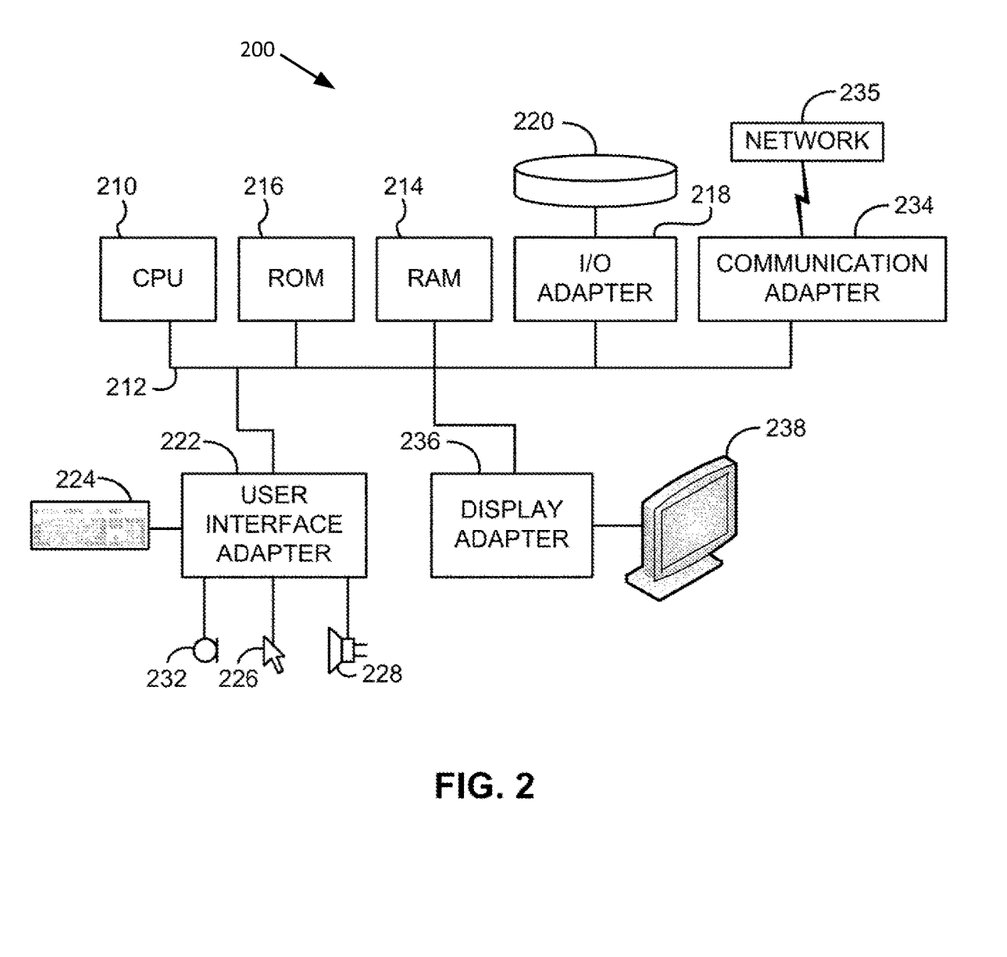
FIG. 2 is a functional block diagram illustrating a computing or user device for use in a data processing or information handling system, according to an embodiment of the present disclosure.

FIG. 2 shows a representative hardware environment associated with a user device 116 and/or server 114 of FIG. 1, in accordance with an embodiment. Such figure illustrates an example hardware configuration of a workstation 200 having a central processing unit 210, such as a microprocessor, and a number of other units interconnected via a system bus 212.

The workstation 200 shown in FIG. 2 includes Random Access Memory (RAM) 214, Read Only Memory (ROM) 216, I/O adapter 218 for connecting peripheral devices such as disk storage units 220 to the bus 212, user interface adapter 222 for connecting a keyboard 224, mouse 226, speaker 228, microphone 232, and/or other user interface devices such as a touch screen and a digital camera (not shown) to the bus 212, communication adapter 234 for connecting the workstation to a communication network 235 (e.g., a data processing network) and display adapter 236 for connecting the bus 212 to a display device 238.

The workstation may have resident thereon an operating system such as the Microsoft Windows® Operating System (OS), MAC OS, UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
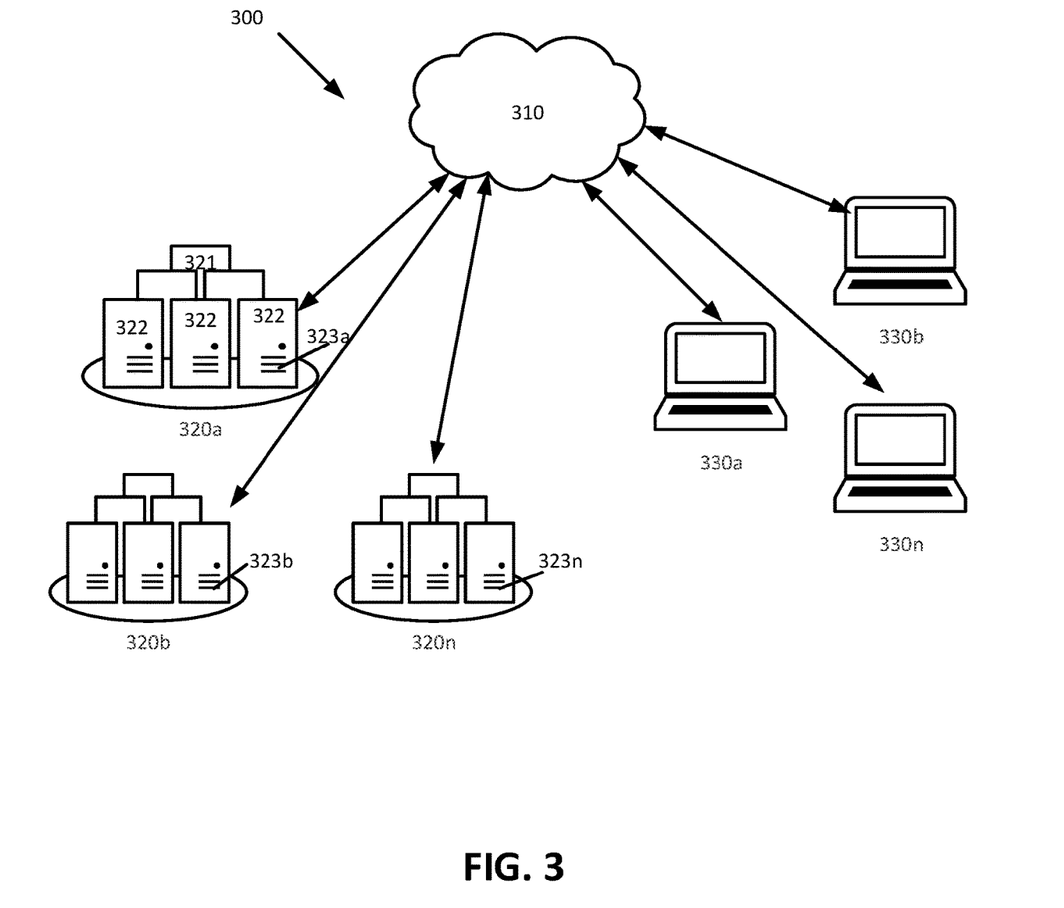
FIG. 3 depicts an example block diagram of an information and data storage or management system, according to an embodiment of the present disclosure.

Referring now to FIG. 3, there is illustrated an example block diagram of an information management system 300 that includes a set of networked data storage systems 320a, 320b . . . 320n and client devices 330a, 330b . . . 330n in communication via a data network 310 and in accordance with implementations of this disclosure. It can be appreciated that the implementations disclosed herein are not limited by the number of storage devices or data storage systems attached to data network 310. It can be further appreciated that storage devices or data storage systems attached to data network 310 are not limited by communication protocols, storage environment, physical location, etc.

In one embodiment, each data storage system 320a, 320b . . . 320n may include a storage subsystem 321 and storage devices 322. The storage subsystem 321 may comprise a storage server or an enterprise storage server, such as the IBM Enterprise Storage Server®. (IBM and Enterprise Storage Server are registered trademarks of IBM). The storage devices 322 may comprise storage systems known in the art, such as a Direct Access Storage Device (DASD), Just a Bunch of Disks (JBOD), a Redundant Array of Independent Disks (RAID), a virtualization device, tape storage, optical disk storage, or any other data storage system. In certain embodiments, multiple storage subsystems may be implemented in one storage subsystem 321 and storage devices 322, or one storage subsystem may be implemented with one or more storage subsystems having attached storage devices. In an embodiment, data and metadata corresponding to contents of the storage systems 320a, 320b . . . 320n is collected and stored. Other types of information that generally provides insights into the contents of the storage systems 320a, 320b . . . 320n can also be stored.

In certain embodiments, client devices 330a, 330b . . . 330n may be general purpose computers having a plurality of components, for example as shown in FIG. 2. These components may include a central processing unit (CPU), main memory, I/O devices, and data storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with a CPU and main memory is often referred to as a host system. The client devices 330a, 330b . . . 330n can have at least one operating system (e.g., Microsoft Windows, Mac OS X, iOS, IBM z/OS, Linux, other Unix-based operating systems, etc.) installed thereon, which may support or host one or more file systems and other applications.

The data storage systems 320a, 320b . . . 320n and client devices 330a, 330b . . . 330n communicate according to well-known protocols, such as the Network File System (NFS) or the Common Internet File System (CIFS) protocols, to make content stored on data storage systems 320a, 320b . . . 320n available to users and/or application programs as though the content were stored locally on the client systems 330a, 330b . . . 330n. In a typical mode of operation, the client devices 330a, 330b . . . 330n transmit one or more input/output commands, such as an NFS or CIFS request, over the computer network 310 to the data storage systems 320a, 320b . . . 320n, which in turn issues an NFS or CIFS response containing the requested content over the network 310 to the respective client devices 330a, 330b . . . 330n.

The client devices 330a, 330b . . . 330n may execute (internally and/or externally) one or more applications, which generate and manipulate the content on the one or more data storage systems 320a, 320b . . . 320n. The applications generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications (Microsoft Excel), financial applications, presentation applications (e.g., Microsoft PowerPoint), browser applications, mobile applications, entertainment applications, and so on. The applications may also have the ability to access (e.g., read and write to) data storage systems 320a, 320b . . . 320n using a network file system protocol such as NFS or CIFS. The applications and programs utilized by organizations to run their business provide and use data which is stored and maintained in many formats using different schema (including no schema).

As shown, the data storage systems 320a, 320b . . . 320n, the client devices 330a, 330b . . . 330n, and other components in the information management system 300 can be connected to one another via a communication network 310. The information management system 300 can be an example of a platform on which an organization can run applications for its business and operations. The communication network 310 can include one or more networks or other connection types including any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication network 310 in some cases may also include application programming interfaces (APIs) including, e.g., cloud service provider APIs, virtual machine management APIs, and hosted service provider APIs.

In order to make good use of data, data needs to be efficiently retrieved and sorted for processing. A number of different types of data storage systems can be used in data processing and storage systems for storing, sorting, organizing, managing, searching, and locating data. One type of database storage system that has evolved is relational database systems. The architecture behind relational database systems is that data is organized in a highly structured manner following the relationship model. Data access and retrieval can be accomplished through searches. Searches can be performed through queries issued by users and/or software programs. Queries can be written through a variety of computing languages. One example of a computing language is Structured Query Language (SQL). SQL queries allow the user to describe the desired data and in response a Relational Database Management System (RDBMS) performs the searching to produce the desired data. The data in a relational database system is organized in a highly-structured manner following the relationship model. Data is uploaded, saved, and organized according to a well defined schema. The precise organizational structure or schema of a relational database system keeps the data well-organized and searchable; however, the well-structured organization of the data becomes a substantial burden on large datasets resulting in declining performance on large volumes of data.

Unlike relational databases that are highly structured, Not Only Structured Query Language databases, also referred to as "Not Only SQL" or "NOSQL" databases, are unstructured in nature and have no schema. That is, NOSQL databases have no predetermined set of columns and data types for the data being stored in the database, and allow any number of columns in any sequence in the records. NOSQL databases provide an ability to flexibly load, store, and access data without having to define a schema ahead of time. Removing this up-front data management effort provides flexibility and permits applications to run without having to consider data dependencies and relationships. There are generally four big NOSQL database types: key-value store, document store, column-oriented database, and graph database. In a column-based or column-oriented NOSQL database, data is stored in cells grouped in columns of data rather than as rows of data. HBase is an example of a column-oriented NOSQL distributed database. NOSQL databases work well in distributed databases where unstructured data may be stored across multiple processing nodes, and often across multiple servers. This distributed architecture allows NOSQL databases to be horizontally scalable and has been a solution to handling some of the largest database systems. The proliferation of network computing and NOSQL databases has resulted in an increasingly large amount of data being stored as incompletely structured data using, for example, "Java Script Object Notation" or "JSON", instead of traditional relational models.

One problem with NOSQL databases is the data is not very useful in the format that it is stored, and requires heavy and costly operations to massage the data into a format that is easy to use and analyze. During the analytical processing of the data, it is often important to know the schema of the data records. It is also sometimes necessary to look up specific columns from the NOSQL database records. Without a predefined schema, the analytical process must scan the NOSQL database to build a set of columns present in the database. This process can take a significant amount of time and can be resource intensive. This in turn results in two problems: (i) systems need to maintain copies of data in flat files for faster analytical processing; and (ii) applications use the NOSQL database and analytical processes use flat files resulting in two sources of data.

The present disclosure in one or more embodiments is directed to systems, applications, platforms, and/or methods to ingest or capture data having a variety of schema, or no schema, into a database or data store for purposes of analytical processing, for example analytical processing to detect suspicious and/or criminal activity. In one or more aspects the systems, applications, platforms, and/or methods ingest and/or capture data into one database or data store to run both applications and analytical processing, even in big data environments. In one or more embodiments, a system, application, or platform, and in an aspect a method, includes ingesting data, in an aspect from various sources, into a database or data store, preferably a NOSQL database, that builds the list of columns and data schema during data insertion. In one or more embodiments, the system, application, or platform, and/or method ingests and/or captures the data in a NOSQL database and analytical processing, and in an aspect, the organization's applications, can be run directly against the NOSQL database.

In an aspect, the system, application, platform, and/or method creates a metadata data store used to capture and store the schema of the data records and a separate NOSQL data store used to store the data records. The data load or ingestion process stores data in the NOSQL data store and stores the schema for the data in the separate metadata store. In one or more embodiments, the system, application, platform, and/or method is about associating schema with a record preferably at data loading or ingestion, and in one or more aspects schema is maintained for each record, e.g., on record by record basis. For example, primary key 1 contains the schema for record 1, primary key 2 contains the schema for record 2, and so on. Since the schema is associated with each record at data loading, by the time the data is loaded in the non-relational database (e.g., the NOSQL data store) the schema is already available. That is, both the data and its schema are available at the same time, e.g., before analytical processing, as opposed to identifying the schema post data loading activities. As a result the data is ready for analytical processing immediately after it is loaded. Since the schema for each record is stored based upon the primary key, looking up the schema is fast, which permits access to the data quickly.

Figure 4:
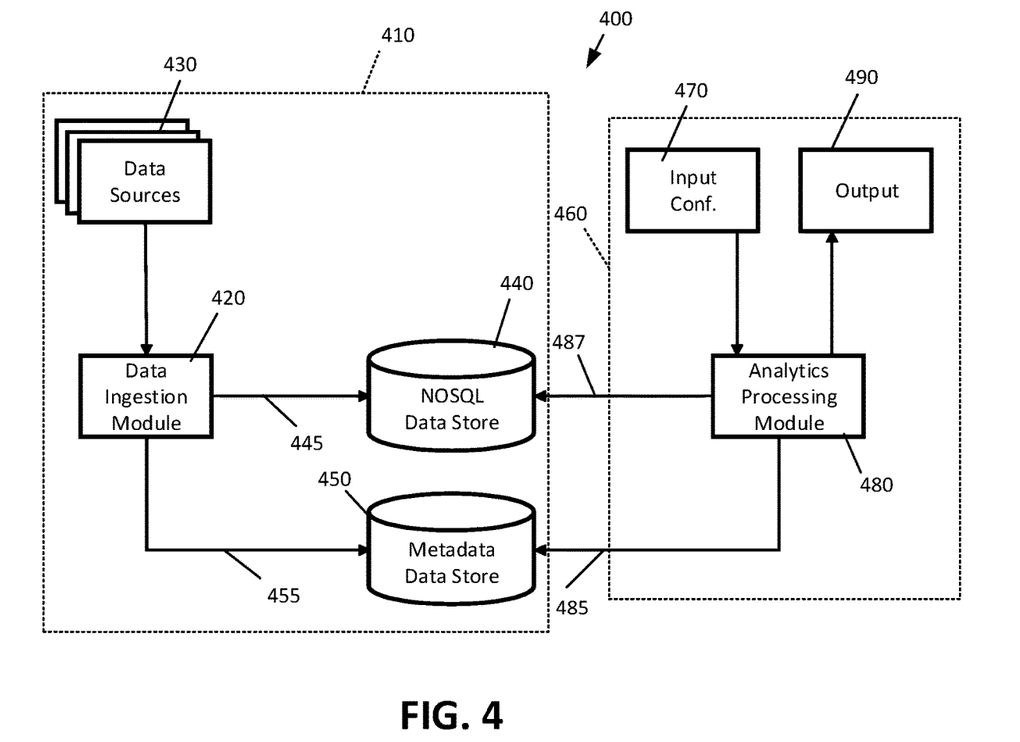
FIG. 4 is a diagrammatic illustration of an ingestion system for capturing data during data insertion and analyzing the captured data, according to an embodiment of the present disclosure.

FIG. 4 illustrates a block diagram of an embodiment of a system or platform and method to ingest data, typically from various data sources which typically have various different schema (including no schema), into a database or data store, and more specifically into both a data store (preferably a NOSQL data store) and a separate metadata store. In a first part 410 of system 400, a data ingestion module 420 reads, loads, and/or ingests input data from one or more data sources 430. The data ingestion module 420 in an embodiment includes circuitry and logic to receive the input data from one or more data sources 430 where the data sources 430 in one or more embodiments have various schema and according to some aspects can have no schema. For example, where a financial institution, such as for example a bank, desires to determine if there is a money laundering scheme or other fraud, the input data 430 can comprise: the transactions occurring with or being processed by the financial institution; the parties to any financial transaction with or through the financial institution; and account information (the customers) of the financial institution. In the case of an insurance organization and the like, the input data 430 can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing the motor vehicle, physician treating patient, etc. The examples above are not limiting and there can be other situations where the system 400 will have application, and additional or other input data can be provided and other data sources can be accommodated.

The system 400 is configured during the data load or insertion process to store, load and/or capture data from the one or more data sources into Data Store 440, preferably NOSQL Data Store 440, and to store, load, and/or capture metadata and/or schema of the data in a separate Metadata Store 450. More specifically at 445 data is loaded to Data Store 440, and at 455 schema from the data sources 430 is loaded to Metadata Store 450. That is, preferably a separate metadata store 450 is used to capture the schema of the data records, and preferably the schema is captured on a record by record basis. In one or more embodiments, the schema of the data sources 430 is provided at or before the data load process. That is the Data Ingestion Module 420 in one or more embodiments receives input on or about the schema of the data (or about the data sources). In one or more aspects, the Data Ingestion Module 420 is configured and/or programmed to search and ingest data in a certain format from the Data Sources 430. Additionally, and/or alternatively the schema of the data sources is read and/or derived by the Data Ingestion Module 420. In a further aspect, a configuration and/or properties file is supplied from which the schema can be read and/or derived.

The second part 460 of the system 400 in FIG. 4 includes Analytics Processing Module 480, which processes and runs analytics on the data. The second part 460 of the system 400 also includes input configuration module 470 for providing the analytics Processing Module 480 with information for setting up the system, for example to detect desired data patterns indicative of suspicious and/or criminal activity or behavior. The input configuration module 470 contains circuitry and logic to receive the input configuration information from the user, and process and/or transmit information to the Analytics Processing Module 480. A user inputs information to the system 400 vis-à-vis the input configuration module 470 so that the Analytics Processing Module 480 knows the type of data analytics to run, such as for example the data patterns indicative of suspicious activity or behavior that the system 400, and in particular the second part 460 of the system 200, will search for and detect. The Analytics Processing Module 480 looks up and/or reads data from the Data Store 440 and then processes/analyzes the received/read data to provide an Output 490. More specifically, in one or more embodiments, the Analytics Processing Module 480 looks up the schema at 485 from the Metadata Store 450, for example looks up the set of columns present in the NOSQL store and their data types from the Metadata Store 450, and based upon the metadata from the Metadata Store 450, the Analytics Processing Module 480 at 487 looks up the data in the Data Store 440. This ability to look up the data eliminates the need to scan the data store during analytical processing to obtain the schema and data. The Analytics Processing Module 480 contains circuitry and logic to receive input configuration data from input configuration module 470, process the input configuration and obtain data from the Data Store 440 (including through use of the metadata store 450), and in one or more embodiments analyze the data and provide an Output 490.

Figure 5:
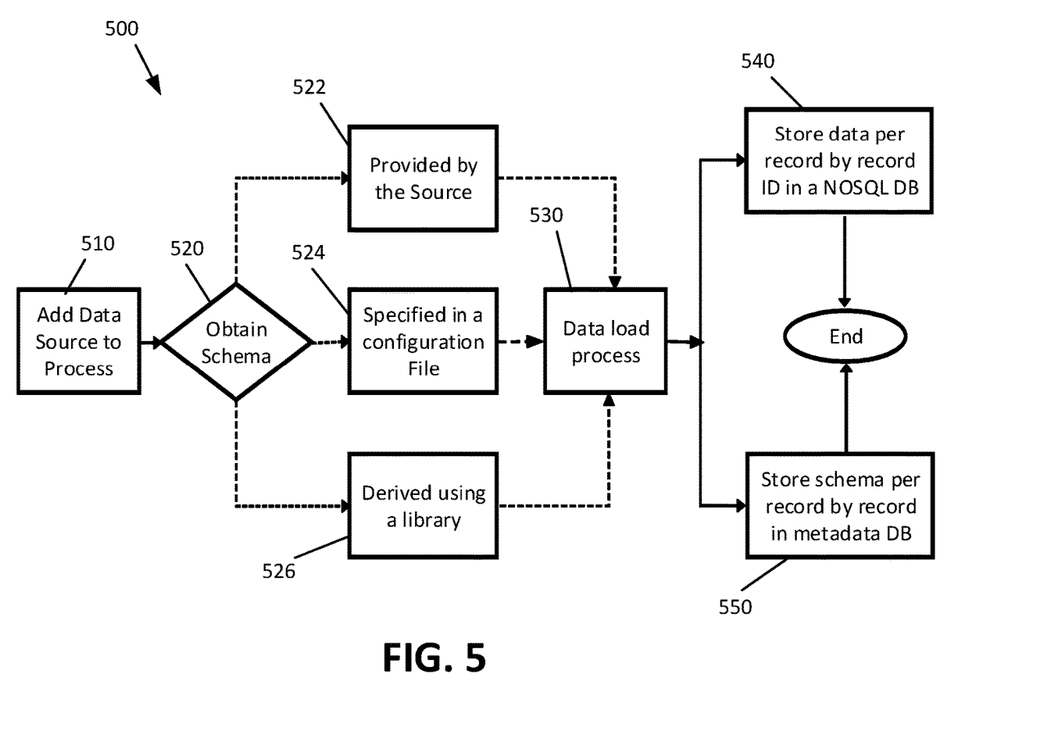
FIG. 5 is an example embodiment of a flow chart illustrating a method and technique of ingesting and/or capturing data from one or more data sources and inserting the data into a data store and schema (e.g., metadata) into a separate metadata store, according to an embodiment of the present disclosure.

Referring now to FIG. 5, an exemplary flowchart in accordance with one or more embodiments illustrating and describing a method of ingesting, inserting, and/or capturing data, preferably from one or more data sources, into a database or data store, preferably a NOSQL database, is disclosed. While the method 500 shown in FIG. 5 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order, unless indicated otherwise.

The process 500 at 510 includes adding a data source to the data insertion or ingestion process. For example, the data insertion or ingestion process 500 can include data obtained or received from one or more data sources. In an embodiment, each data source is added to the process, and in one or more aspects adding each data source to be included in the data ingestion or insertion process 500 adds flexibility to the system. At 520, the process 500 obtains and/or receives the schema of the data to be inserted, captured, or loaded. In one or more embodiments, a Data Ingestion Module obtains and/or receives the schema of the data to be loaded and/or captured. In one or more embodiments the schema of the data source to be added to the process is provided by the source as shown by 522. Alternatively or additionally, in one or more embodiments, the schema of the data source to be added to the process is specified in a file, e.g., a configuration or properties file, provided to and/or read during the process as shown by 524. For example a configuration file or properties file can be read by and/or supplied to the Data Ingestion Module. Obtaining the schema at 520 in one or more embodiments can also be derived, as shown at 526, for example using a library. Using a library to derive a schema typically would include choosing and configuring a library that could ingest the data and output the schema for that data. One such example is BIGQuery Schema Generator Python package. Such libraries inspect the content of the data typically provided in JSON or CSV file and output a schema file. This schema can then be manually inspected and updated if necessary. The libraries typically execute as a command line tool that accepts actual data as input and provides a schema file as output. The generated schema can then be used in the data load process.

The data insertion and/or ingestion process 500 includes at 530 loading the data from the data sources. Loading the data at 530 involves at 540 storing the data on a record by record basis according to and based upon a record ID in a data base or data store, for example data store 440 from FIG. 4. In one or more aspects the data at 540 is preferable stored in a NOSQL database or data store, and at 540 storing the data in one or more embodiments involves building the list of columns and data schema for the NOSQL database/data store. When storing the data at 540 the data in one or more embodiments is stored by a record ID or key, and the data is inserted into the data fields as provided by the schema that was obtained for the data source. The data load process at 530 further includes at 550 storing the schema for the data stored in the NOSQL database in a metadata store on a record by record basis according to and based upon the corresponding record ID used in the data store. For example at 550 the schema relating or corresponding to the data in the data store, e.g., the NOSQL data store 440 in FIG. 4, is stored in the separate metadata store 450 in FIG. 4. So at the data load process at 530, e.g., at data insertion time, the schema of each record is stored in metadata store and the actual data is stored in a separate database, for example a separate NOSQL data store.

In an embodiment, the schema for each record is stored separately. In this approach, the primary key of the record is stored in the metadata store along with the schema for that record only. The schema may include but is not limited to column names, column sequence, column data types, and more. In an alternative method, global schema is stored for all records. In this global approach, the primary key of the record is not stored in the metadata store. Instead, a global schema is created in the metadata store. This global schema includes a list of all columns present in all records along with their data types and other information.

Figure 6:
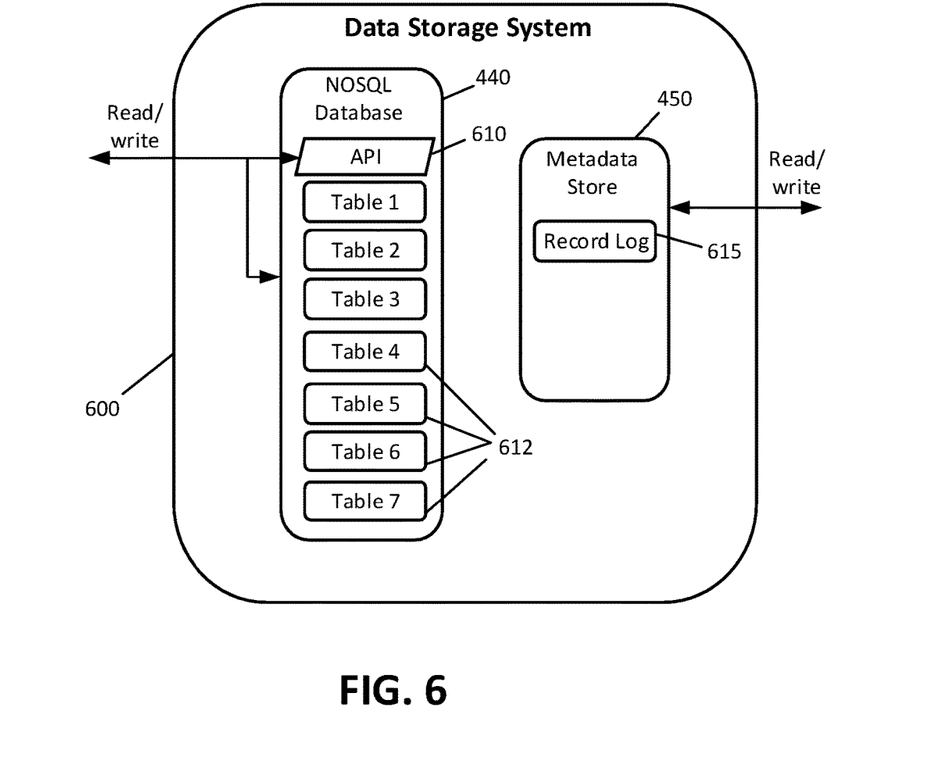
FIG. 6 is a diagrammatic illustration of a data storage system that includes a data store and a metadata store according to an embodiment of the present disclosure.
Figure 7:
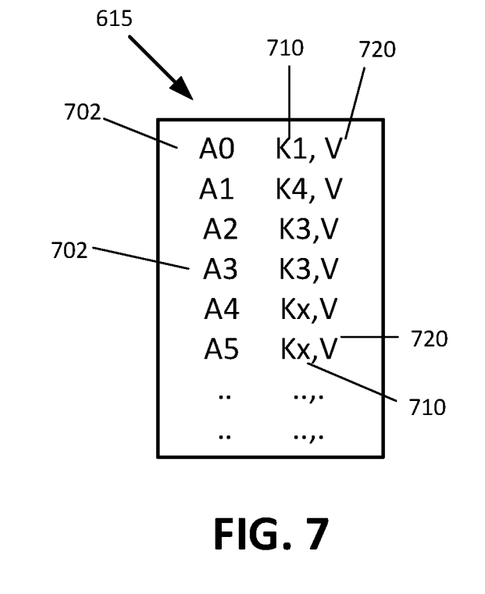
FIG. 7 is an example depiction of a record log for data and/or metadata stored in a data storage system according to an embodiment of the present disclosure.

Referring to FIG. 6, an embodiment of a data storage system 600 is illustrated. The data storage system 600 can be run across a cluster of user devices 330. Data storage system 600 in one or more embodiments includes NOSQL database or data store 440, preferably a column-oriented NOSQL database, and metadata store 450. The records in the metadata store 450 and the records in the data store 440 can be organized in a number of different ways. For illustration purposes the metadata, e.g., the schema, in the metadata store 450 can be saved in records. Each record in a large collection of data and/or metadata can be identified by a key. A key is a unique identifier for a record. A key can be provided or created when a record is written (stored) into a data storage system and can be used to retrieve that record and the data it contains. Records in one or more embodiments can be stored in a record log where the record is mapped or associated with the key. A number of different types of structures are used for storing, sorting, organizing, and managing data and/or metadata in data storage and computerized systems. Tree structures are one technique used to optimize the organization of, and ability to locate a particular item stored in, a large collection of data and information. Keys can be stored and sorted in a tree, for example a balanced tree, to provide accesses to the keys. All records written to the tree in one or more aspects are logged in the record log 615. In an embodiment, each record's log address is stored in an in-memory index sorted by the key. The record log in one or more embodiments is updated continuously and in an aspect can be saved persistently in the data storage system. A tree in an embodiment has one record log, and in an aspect all tree record writes are ordered chronologically. One example of a record log associating a key with a record is shown in FIG. 7. Each entry 702 in Record Log 615 has a unique key 710 associated with a value (V) 720, where the value V can be data or information. In FIG. 7, the Record Log 615 is a table structure, A0-A5 are entries 702 in the table structure, K1-Kx are keys 710, and V are values or records 720 associated with the unique key 710. The records or values 720 can be data and/or metadata itself or in an embodiment a log or memory address where the data and/or metadata is stored.

Figure 8:
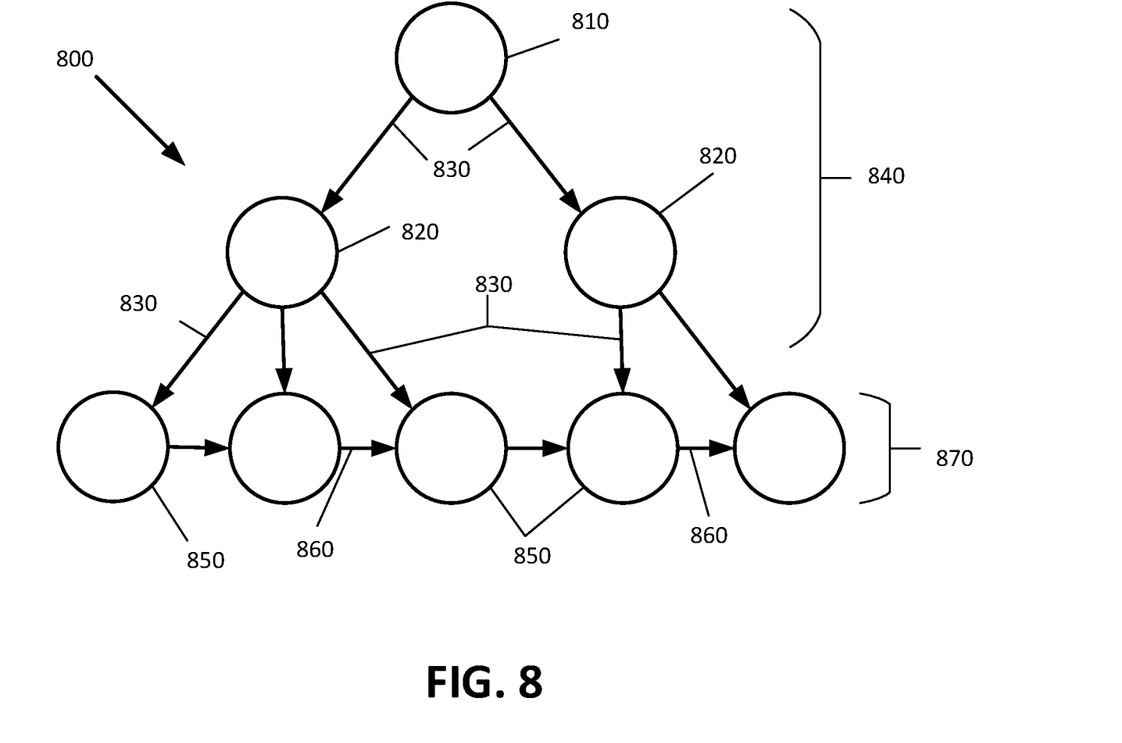
FIG. 8 is an example of a data tree structure.
Figure 9:
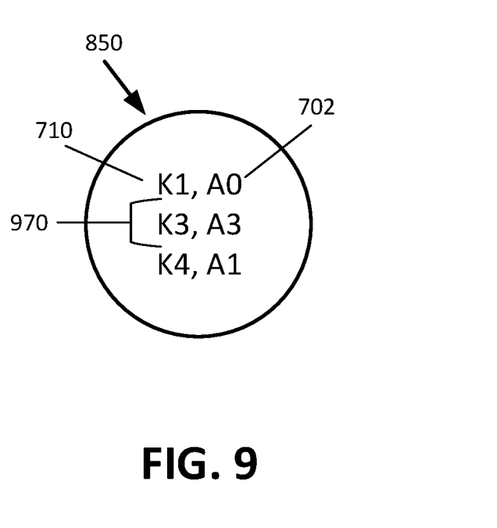
FIG. 9 is an example leaf node for a data tree structure.

There are a number of different tree structures for organizing data and its index. A "B-tree" is one example of a tree for organizing data or metadata stored on a data storage system. A "B-tree" is a self-balancing tree data structure that maintains sorted data and allows searches, sequential access, insertions, and deletions in logarithmic time. A "B-Tree" has a root node, internal nodes, and leaf nodes. The root can be either a leaf node or an internal node. Nodes in a "B-tree" can have more than two children. The order or branching factor "d" of a "B-Tree" measures the capacity (i.e., the number of children nodes) of internal nodes in the tree. FIG. 8 illustrates example B-tree 800 having a root node 810, internal nodes 820, and leaves 850. The nodes in tree 800 are illustrated as connected by pointers or references 830 and links 860. The lowest level 870 of the tree has leaf nodes 850 that are record containing nodes, and the upper levels or top portion 840 of the tree 800 comprises the internal nodes 820 and the root 810 do not contain any of the records and are an index to the leaf nodes 850. FIG. 9 shows an illustration of the data and entries contained in leaf nodes 850 for the Record Log 615 of FIG. 7. In this regard, each leaf node 850 in FIG. 9 contains multiple entries 970 where each entry 970 is sorted by key 710 and is associated with an entry 702 in the Record Log 615 saved in the data storage system.

Referring back to FIG. 6 data storage system 600 is illustrated having NOSQL database 440. NOSQL data base 440 in one or more embodiments can be a Column-Oriented NoSQL database 440. Column-Oriented database 440 includes applications programming interface (API) 610 and a plurality of tables 612. While only seven (7) tables 612 are shown in FIG. 6, it can be appreciated that column-oriented NoSQL database 440 can host one to many more tables, and each table could be large with millions and even billions of rows with potentially millions of columns of data. Column-oriented NoSQL database 440, e.g., HBase, typically has many tables 612 and each table 612 contains many rows of data, where each row has a number of columns that can vary per row. Each row of data in table 912 includes a unique row key that uniquely identifies each row of data. Data inside each row can be organized into column families and each column family can have one or more column qualifiers, also referred to as column names.

Figure 10:
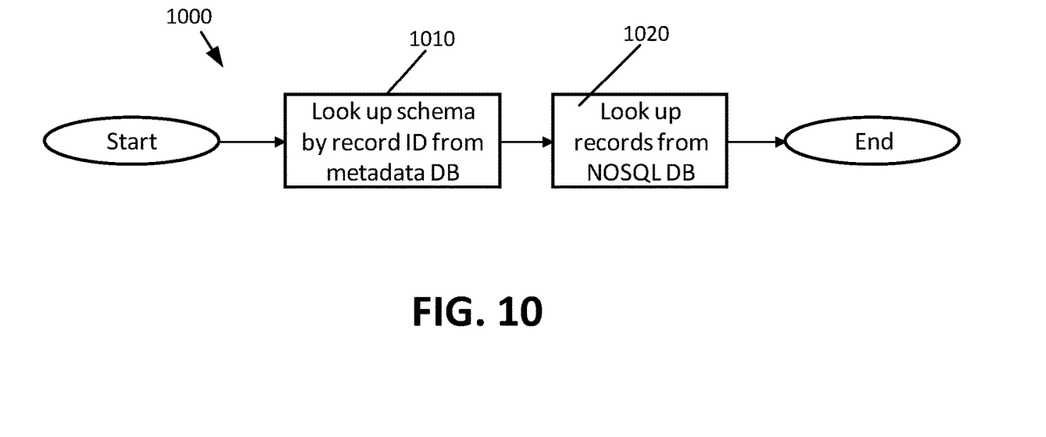
FIG. 10 is an example embodiment of a flowchart illustrating a method and technique of locating data from a data store according to an embodiment of the present disclosure.

Referring now to FIG. 10, an exemplary flowchart in accordance with one or more embodiments illustrating and describing a method of using the database storing the data and the separate metadata store to facilitate data analytics, including locating desired data, is disclosed. While the method 1000 shown in FIG. 10 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, simultaneously, or the steps may be performed in the order disclosed or in an alternate order, unless indicated otherwise.

At runtime, the analytical process looks up the schema from the metadata store first, typically using the record ID. This lookup of the schema provides information about all the columns, including possibly their sequence and their data types. That is during analytical processing the schema is looked up in the metadata store to provide information on the columns present in the NOSQL data store and their types of data. Using this first approach the process is able to look up the schema for each record. In the process 1000, the schema at 1010 is looked up from the metadata store, e.g., metadata store 450 shown in FIG. 4, by the record ID. Knowing the schema of the database, the process 1000 at 1020 looks up the desired records from the NOSQL database, e.g. the NOSQL data store 440 shown in FIG. 4. That is, based upon the metadata received from the metadata store, the analytical process looks up the data in the NOSQL database. Knowing the schema from the metadata store, and having the record ID, the analytical process can easily locate specific columns in the database, e.g., NOSQL database 440, that contain the desired data, and in aspects looks up the data type and other information.

The analytical process uses the record ID to obtain the schema for that record from the metadata store. At this point, the analytical process has both the full data record and the full schema of that record. The schema typically includes the following information: list of attributes in that record (e.g., name, account balance, last transaction amount, last transaction date, transaction flagged for AML, etc.), the sequence in which the data attributes are present, data types (number, string, date, etc.), and whether an attribute is required or optional. Here are some examples of how the analytical process can use these two pieces of information: (1) the analytical process can use this information to know whether a piece of information is present in the record or not. For example, the process can see whether "transaction flagged for AML" attribute is present or not. Another example, (2) the analytical process could use the schema information to validate the record. For example, it could reject/discard or omit the record if certain required data attributes are not present. The analytical process could (3) apply processing rules based upon the schema. For example, if multiple addresses are present, choose the address with type of residence. The analytical process could (4) pick specific data attributes to run calculations. For example, the analytical process cold supply a subset of data attributes to a machine learning model to calculate AML risk score.

While illustrative embodiments described above can be implemented in hardware, such as in units and circuitry of a processor, various aspects of the illustrative embodiments are implemented in software. For example, it will be understood that each block of the flowchart illustration in FIGS. 5 & 10, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of capturing data in an electronic data storage system, the method comprising:
    identifying new data to be stored in the electronic data storage system from one or more data sources, wherein the new data includes structured data organized in a relationship database having a schema;
    obtaining the schema for the structured data corresponding to the identified new data to be stored in the electronic data storage system;
    storing the identified new data to be stored in the electronic data storage system in a Not Only Structured Query Language (NOSQL) database in the electronic data storage system;
    storing the schema for the structured data corresponding to the identified new data stored in the electronic data storage system in a metadata store in the electronic data storage system wherein the metadata store is separate from the NOSQL database; and
    associating the schema for the structured data stored in the metadata store with corresponding identified new data stored in the NOSQL database.

2. The method according to claim 1, further comprising providing the schema for the structured data corresponding to the identified new data to be added to the electronic data storage system.

3. The method according to claim 1, wherein obtaining the schema for the structured data corresponding to the identified new data comprises obtaining the schema from at least one of a group consisting of a configuration file, a properties file, and combinations thereof.

4. The method according to claim 1, wherein obtaining the schema for the structured data corresponding to the identified new data comprises deriving the schema for the structured data from a library.

5. The method according to claim 1, further comprising storing the identified new data in the NOSQL database in the electronic data storage system on a record by record basis.

6. The method according to claim 5, wherein the identified new data is stored in the NOSQL database by a record ID.

7. The method according to claim 1, further comprising storing the schema in the metadata store on a record by record basis.

8. The method according to claim 7, wherein the schema is stored in the metadata store by a record ID.

9. The method according to claim 8, further comprising obtaining search data from the electronic data storage system by looking up the schema by the record ID from the metadata store.

10. The method according to claim 9, further comprising looking up the records from the NOSQL database using the schema obtained from the metadata store.

11. A computer program product comprising a machine readable medium storing instructions that, when executed by at least one programmable processor, cause the at least one programmable processor to perform operations comprising:
    adding a new source of data to be stored in the data storage system, wherein the data to be stored includes structured data organized in a relational database having a schema;
    obtaining the schema for the structured data to be stored in the data storage system;
    on a record by record basis, storing the data to be stored in the data storage system by a record ID in a Not Only Structured Query Language (NOSQL) database in the electronic data storage system; and
    on a record by record basis, storing the schema for the structured data to be stored in the data storage system by the record ID in a metadata store in the electronic data storage system wherein the metadata store is separate from the NOSQL database.

12. The computer program product according to claim 11, further comprising instructions that, when executed by the at least one programmable processor, cause the at least one programmable processor to perform operations comprising:
    providing the schema for the structured data to be added to the data storage system.

13. The computer program product according to claim 11, further comprising instructions that, when executed by the at least one programmable processor, cause the at least one programmable processor to perform operations comprising:
    obtaining the schema for the structured data from at least one of a group consisting of a configuration file, a properties file, and combinations thereof.

14. The computer program product according to claim 11, further comprising instructions that, when executed by the at least one programmable processor, cause the at least one programmable processor to perform operations comprising:
    obtaining the schema for the structured data comprises deriving the schema for the new source of data from a library.

15. The computer program product according to claim 11, further comprising instructions that, when executed by the at least one programmable processor, cause the at least one programmable processor to perform operations comprising:
    obtaining search data from the electronic data storage system by looking up the schema by the record ID from the metadata store.

16. The computer program product according to claim 15, further comprising instructions that, when executed by the at least one programmable processor, cause the at least one programmable processor to perform operations comprising:

looking up a record from the NOSQL database using the schema obtained from the metadata store.

17. A system comprising:
at least one programmable processor;
a data storage system comprising a Not Only Structured Query Language (NoSQL) database for storing data and a separate metadata store for storing schema corresponding to the data stored in the NOSQL database;
a machine-readable medium storing instructions that, when executed by the at least one programmable processor, cause the at least one programmable processor to:
add a new source of data to be stored in the data storage system, wherein the data to be stored includes structured data organized in a relational database having a schema;
obtain the schema for the structured data to be stored in the data storage system;
on a record by record basis, store the data to be stored in the data storage system by a record ID in a Not Only Structured Query Language (NOSQL) database in the electronic data storage system; and
on a record by record basis, store the schema for the structured data to be stored in the data storage system by the record ID in a metadata store in the electronic data storage system wherein the metadata store is separate from the NOSQL database.

18. The system of claim 17, further comprising instructions that, when executed by the at least one programmable processor, cause the at least one programmable processor to perform at least one of a group consisting of (i) providing the schema for the structured data to be added to the data storage system; (ii) obtaining the schema for the structured data from at least one of a group consisting of a configuration file, a properties file, and combinations thereof; and (iii) deriving the schema for the structured data from a library.

19. The system of claim 17, further comprising instructions that, when executed by the at least one programmable processor, cause the at least one programmable processor to obtain search data from the electronic data storage system by at least in part looking up the schema by the record ID from the metadata store.

20. The system of claim 17, further comprising instructions that, when executed by the at least one programmable processor, cause the at least one programmable processor to look up a record from the NOSQL database using the schema obtained from the metadata store.

* * * * *